United States Patent [19]
Wilde

[11] Patent Number: 5,822,090
[45] Date of Patent: Oct. 13, 1998

[54] UTILIZATION OF FERROELECTRIC DOMAIN SCREENING FOR HIGH CAPACITY HOLOGRAPHIC MEMORY

[75] Inventor: Jeffrey P. Wilde, Mountain View, Calif.

[73] Assignee: Quinta Corporation, San Jose, Calif.

[21] Appl. No.: 654,923

[22] Filed: May 29, 1996

[51] Int. Cl.[6] .............................. G03H 1/18; G03H 1/28; G11B 11/12
[52] U.S. Cl. .................................. 359/7; 359/24; 369/103
[58] Field of Search .................................. 359/3, 4, 7, 22, 359/24; 430/1, 2; 369/103; 365/125, 216

[56] References Cited

U.S. PATENT DOCUMENTS

| | | | |
|---|---|---|---|
| 3,932,299 | 1/1976 | Phillips | 359/7 |
| 5,422,873 | 6/1995 | Kewitsch et al. | 359/10 |

OTHER PUBLICATIONS

F. Micheron et al., *Field and Time Thresholds for the Electrical Fixation of Holograms Recorded in $(Sr_{0.75}Ba_{0.25})Nb_2O_6 Crystals*$, American Institute of Physics, vol. 23, No. 2, Jul. 15, 1973, pp. 71–72.

S. Oriov et al., *Spatial and Temporal Characteristics Of Electrically Fixed Holograms In Photorefractive Strontium–Barium niobate*, American Institute of Physics, vol. 64, No. 7, Feb. 14, 1994, pp. 824–826.

M. Horowitz, A. Bekker, and B. Fischer *Image and Hologram Fixing Method With $Sr_xBa_{1-x}Nb_2O_6 Crystals$*, Optical Society of America, vol. 18, No. 22, Nov. 15, 1993, pp. 1954–1966.

R. Cudney et a., *Photorefractive and Domain Gratings In Barium Titanate*, American Institute of Physics, vol. 63, No. 25, Dec. 20, 1993, pp. 3399–3401.

S. Orlov et al., *Dynamic Electronic Compensation Of Fixed Gratings In Photorefractive Media*, American Institute of Physics, vol. 63, No. 18, Nov. 1, 1993, pp. 2466–2468.

R. Cudney et al., *Interaction Between Domain Reversal Processes And Light in Barium Tatanate*, Ferroelectrics vol. 157, 1994, pp. 45–50.

Y. Qiao et al., *Electrical Fixing Of Photorefractive Holograms In $Sr_{0.75}Ba_{0.25}Nb_2O_6$*, Optical Society of America, vol. 18, No. 12, Jun. 15, 1993, pp. 1004–1006.

A. Kewitsch et al., *Selective Page–addressable Fixing of Volume Holograms In $Sr_{0.75}Ba_{0.25})Nb_2O_6$ Crystals*, Optical Society of America, vol. 18, No. 15, Aug. 1, 1993, pp. 1262–1264.

F. Kahmann et al., *Photoassisted Generation of Ferroelectric Domain Gratings in SBN*, Elsevier Science B.V., Optics Communications 107, Apr. 1, 1994, pp. 6–10.

A. Kewitsch et al., *Tunable Quasi–Phase Matching Using Dynamic Ferroelectric Domain Gratings Induced By Photorefractive Space–Charge Fields*, American Institute of Physics, vol. 64, No. 23, Jun. 6, 1994, pp. 3068–3070.

R. Cudney et al., *Enhancement of the Amplitude and Lifetime of Photo–induced Space–charge Fields in Multi–Domain Ferroelectric Crystals*, The American Physical Society, vol. 72, No. 24 Jun. 13, 1994, pp. 3883–3886.

A. Kewitsch et al., *Ferroelectric Domain Gratings In Strontium Barium Niobate Induced by Photorefractive Space Charge Fields*, American Physical Society, vol. 73, No. 8, Aug. 22, 1994, pp. 1174–1177.

*Primary Examiner*—Jon W. Henry
*Attorney, Agent, or Firm*—Blakely, Sokoloff, Taylor & Zafman LLP

[57] ABSTRACT

The present invention describes a method for high capacity holographic data storage in photorefractive crystals. A doped ferroelectric crystal is used as a data storage medium. Prior to the recording, the crystal is depoled either thermally or electrically. Multiplexed photorefractive holograms are then recorded by illuminating the crystal in such a manner that domain screening of the photorefractive space-charge field occurs. The crystal is then repoled to enable the reading of the holograms stored within the crystal. Finally, any given hologram is readout by illuminating the crystal at the Bragg condition, which typically occurs while illuminating the crystal at the same angle and/or wavelength at which the hologram was recorded.

33 Claims, 11 Drawing Sheets

One Hologram
Diff Efficiency $\eta\ peak = \eta_0$

Two Holograms
Diff Efficiency $\eta\ peak = \dfrac{\eta_0}{(2)^2}$

•
•
•

N Holograms
Diff Efficiency $\eta\ peak = \dfrac{\eta_0}{(N)^2}$

One Hologram Diff Efficiency $\eta \text{ peak} \approx \eta_0$

Two Holograms Diff Efficiency $\eta \text{ peak} \approx \dfrac{\eta_0}{2^x}$ where $1 \leq x \leq 2$

• • •

N Holograms Diff Efficiency $\eta \text{ peak} = \dfrac{\eta_0}{N^x}$ where $1 \leq x \leq 2$

UTILIZATION OF FERROELECTRIC DOMAIN SCREENING FOR HIGH CAPACITY HOLOGRAPHIC MEMORY

BACKGROUND OF THE INVENTION

1. Field of the Invention

This invention relates to the field of data storage, and more specifically, to a method of ferroelectric domain screening in recording and reading holographic memory.

2. Background Information

The power of desktop microprocessors has evolved at an astonishing rate. In the 1970s some microprocessors offered a sluggish 0.5 million instructions per second (MIPS), while some current microprocessors provide users with 160 MIPS. This trend is certain to continue as clock speeds increase further and designers move toward higher performance architectures. At these higher levels of sophistication, microprocessors have become input/output (I/O) limited by conventional main memory designs, such as DRAM, as well as by the speed at which the bus communicates with peripheral devices, such as video cards and hard disk drives. However, new bus architectures and high-speed fiber-optic local area networks (LANs) now provide data transfer rates on the order of a few gigabits per second (Gbits/sec), thereby making the speed of the peripheral devices themselves the most significant limiting factor. This is especially true for mass data storage peripherals.

Mass data storage is presently dominated by serial technologies, namely rotating disk drives, both magnetic and optical, along with magnetic tape for archival or backup storage. Current disk array approaches, although capable of very large multi-Gbyte capacity, are I/O limited by both slow access times, for example approximately 1–10 milliseconds (ms), and slow sustained data transfer rates, for example approximately 10–100 million bits per second (Mbps). Despite these limitations, the need for mass data storage is growing.

One current device for mass data storage is CD-ROM. Although, CD-ROM is the medium of choice for storing and distributing large interactive programs, this serial technology has important speed limitations. The speed of the CD-ROM drives are simply not fast enough to support advanced high-bandwidth applications. This existing I/O gap must be surmounted if modern desktop workstations, particularly network file servers, are to meet the growing demand for multimedia graphical processing. Such multimedia graphical applications require storage of large image databases and full-motion digital video with fast random access and transfer rates that are commensurate with current high-speed bus and local area network technologies.

Holographic data storage devices have the potential to overcome the I/O gap. This can be achieved by using a parallel page-based architecture and by employing high-speed electronic addressing to reduce access latency and improve the sustained data transfer rate by approximately two to three (2–3) orders of magnitude compared to conventional serial devices, placing it in the gigabit per second (Gbps) range. Holographic data storage has the potential to redefine the rules for computer system design. Busses and controllers would no longer be limited by peripheral devices, and new applications based on rapid access to large graphical databases would become feasible. These applications include, for example, databases of scanned documentation, geographical and weather maps, as well as high-definition digital video for interactive multimedia, virtual reality, neural network computations, and image or target identification.

A generic holographic data storage (HDS) architecture 100 is illustrated in FIG. 1. The architecture 100 of FIG. 1 is capable of storing and quickly retrieving two dimensional (2-D) pages of digital data 110. The device 100 uses an angle and/or wavelength encoded reference beam 120 to store many superimposed data pages in the form of multiplexed Fourier domain holograms. A set of data pages, referred to as a stack 130, occupies a small portion of the total recording volume of the storage array 140, and many stacks 130 are spatially multiplexed to utilize the full storage capacity.

Although the potential benefits of holographic data storage are appealing, in particular the potentially large data storage capacity of photorefractive media, early prior art methods and systems have been limited in their capabilities and practical use. For example, the basic system components for these early prior art systems, such as signal light modulators (SLMs) and photodetector arrays, did not have the necessary bandwidth (both spatial and temporal) to accommodate the potential storage capacity and I/O transfer rates of a holographic based system. In addition, lasers for these early prior art systems were too bulky and power-inefficient to be considered viable sources.

Presently, many of the bottlenecks of these early prior art methods and systems have been overcome, making feasible HDS drives with capacities in the hundreds of Gbytes and data transfer rates on the order of a few Gbits/sec. Not only has the performance of many enabling devices improved substantially, but there are also new devices such as electrically tunable diode lasers and diode laser arrays which open the door to a myriad of enhanced system designs. More recent prior art methods and systems for holographic data storage however, have exhibited other problems such as low diffraction efficiencies during readout, partial erasure of the hologram during readout, and erasure of previously recorded holograms during multiplexing.

Photorefractive materials, in particular, photorefractive crystals, have been used in some prior art holographic data storage methods and systems. The diffraction efficiency ($\eta$) of a hologram is equal to the intensity of the diffracted light leaving the crystal ($I_{diff}$) divided by the intensity of the reference incident beam ($I_{ref}$) or $\eta = I_{diff}/I_{ref}$. The diffraction efficiency is also linked to the length of the exposure time for the particular hologram being recorded. For example, holograms with longer recording (i.e. exposure) times are likely to have higher diffraction efficiencies than holograms with shorter recording times. This is true, at least, until the crystal reaches steady state, at which point the diffraction efficiency of a particular hologram no longer grows. In addition, the diffraction efficiency may also be limited by charge saturation effects. Charge saturation is discussed further in the detailed description below.

One of the most fundamental limitations of prior art methods and systems for holographic data storage is the problem of erasure during sequential multiplexing. It is well established that when sequentially multiplexing holograms, using prior art methods and systems, a detailed recording schedule is needed to produce equal efficiency holograms, and the diffraction efficiency of any one hologram falls off as $\eta_{peak} = \Delta\eta_0/N^2$, where $\Delta\eta_0$ is the dynamic range (i.e. the range of the maximum diffraction efficiency for storage of a single hologram) and N is the total number of superimposed holograms. The $1/N^2$ dependence arises from the fact that existing holograms generally experience erasure when new superimposed holograms are added to a stack. For example, a working holographic memory will most likely have at least N=100 pages per stack, if not more, thus the diffraction efficiency of each individual hologram is very low (i.e. on the order of $\Delta\eta_0/10{,}000$ or less). Therefore, prior art methods of sequential multiplexing make poor use of the available dynamic range.

In prior art methods and systems, a regimented recording (or exposure) schedule is generally followed. In other words, if the number of holograms to be recorded is known, then each of the holograms may be recorded for a specific amount of time, wherein the first hologram recorded is exposed for the longest amount of time, the second hologram is exposed a somewhat shorter time than the first, the third is exposed less than the second, and so on until the last hologram requiring the least amount of exposure time is reached. For example, a first hologram is exposed for 100 milliseconds (ms), a second hologram is exposed for 49.0 ms, a third hologram is exposed for 32.7 ms, and a last hologram is exposed for 24.6 ms. The problem with such a regimented schedule is that the number of holograms to be recorded, along with the precise crystal recording and erasure time constants, must be known beforehand.

FIGS. 2a–c graphically illustrate the diffraction efficiency of a photorefractive crystal during multiplexing using a prior art method and system. It is assumed that in FIGS. 2a–c, an appropriate recording schedule has been used to produce multiplexed holograms with approximately equal peak diffraction efficiencies. FIG. 2a illustrates a single hologram recorded in a photorefractive material at an angle $\theta_1$, where $\eta_{peak}=\eta_0$ and where $\eta_0$ is the maximum diffraction efficiency for this particular photorefractive material. FIG. 2b illustrates the first and second hologram recorded in a photorefractive material at angles $\theta_1$ and $\theta_2$, respectively. The peak diffraction efficiency of the holograms in FIG. 2b has fallen off by a factor of four (4) from the peak diffraction efficiency in FIG. 2a. FIG. 2c illustrates the first, second, and Nth holograms recorded in a photorefractive material at angles $\theta_1$, $\theta_2$, and $\theta_N$, respectively. In general, using prior art approaches, the peak diffraction efficiency falls off rapidly with increasing multiplexing. More specifically, $\eta_{peak}$ has been found to scale as $1/N^2$.

Because of the erasure during multiplexing, most prior art methods and systems for holographic data storage are severely restricted in storage capacity compared to the theoretical maximum. Thus, such prior art methods and systems are unnecessarily limited in their use.

Previous research has also addressed another important problem in the area of photorefractive data storage, namely that of erasure during readout. One prior art method attempted to solve the problem of erasure during readout of the hologram by applying an electric field pulse with negative polarity to the crystal along the c-axis. This method is referred to as "electrical fixing." In this prior art method the crystal is first poled using a positive polarity electric field. Next sequential multiplexing is performed to record holograms at varying angles (and/or wavelengths). After recording, an electric field pulse with negative polarity is applied to the crystal for a suitable duration along the c-axis.

FIG. 3 illustrates the diffraction efficiencies published with regard to one study of the above described electrical fixing method. Reading the graph from left to right, at step 310, a hologram is recorded in the crystal. At step 320, the hologram is read out. As illustrated at step 320, optical erasure of the hologram occurs during readout. Next at step 330, a hologram is again recorded in the crystal. Before reading the hologram, at step 340, an electric field pulse with negative polarity is applied to the crystal. Then at step 350, the hologram is read out. As is illustrated the hologram is not erased during readout and is "electrically fixed" within the crystal. If it is not desired to keep the fixed hologram within the crystal, then at step 360, the hologram may be electrically erased.

FIG. 4 illustrates a ferroelectric hysteresis curve (or loop) for the prior art electrical fixing method. The hysteresis curve represents the macroscopic response averaged over the recording volume. At point 410, the crystal is positively poled by applying a positive electric field (E). The positive electric field is then removed and the crystal settles to point 420 where recording is performed. After recording, an electric field pulse (i.e. "fixing pulse") with negative polarity is applied to the crystal. Following the fixing pulse the crystal settles to point 430 where readout is performed.

The electrical fixing method, in theory, helps to alleviate the problem of erasure upon readout, in practice however, several problems have come to light. One such problem with electrical fixing is that although an early report of the electrical fixing method indicated high diffraction efficiencies upon readout, more recent studies using similar prior art techniques have shown that the fixed diffraction efficiencies are consistently found to be much lower, typically below one percent (1%). Another problem with the electrical fixing method is that the results of using this method have been found to have low repeatability. In other words, repeating the same steps, using the same parameters, on the same (or similar) crystal does not necessarily provide the same results, thus repeatability is low. Additionally, the electrical fixing method does not solve the problem of partial erasure during sequential multiplex recording, as is described above, and therefore still requires a regimented recording schedule.

Thus, what is needed is a method and system for holographic data storage that has improved diffraction efficiencies, enables a more flexible recording schedule, and accommodates an overall higher storage density.

SUMMARY OF THE INVENTION

The present invention describes a method for high capacity holographic data storage in photorefractive crystals. A doped ferroelectric crystal is used as a data storage medium. Prior to recording, the crystal is depoled either thermally or electrically. Multiplexed photorefractive holograms are then recorded by illuminating the crystal in such a manner that domain screening of the photorefractive space-charge field occurs. The crystal is then repoled to enable the reading of the holograms stored within the crystal. Finally, any given hologram is read out by illuminating the crystal at the Bragg condition, which typically occurs while illuminating the crystal at the same angle and/or wavelength at which the hologram was recorded.

Additional features and benefits of the present invention will become apparent from the detailed description, figures, and claims set forth below.

BRIEF DESCRIPTION OF THE DRAWINGS

The present invention is illustrated by way of example and not limitation in the accompanying figures in which:

FIG. 6b illustrates local domain reversal in a the ferroelectric crystal of FIG. 6a.

FIG. 7b illustrates reading the photorefractive hologram recorded in FIG. 7a.

DETAILED DESCRIPTION

A Novel Utilization of Ferroelectric Domain Screening for High Capacity Holographic Memory is disclosed. In the following description, numerous specific details are set forth such as specific materials, parameters, configurations, patterns, etc. in order to provide a thorough understanding of the present invention. It will be obvious, however, to one skilled in the art that these specific details need not be employed to practice the present invention. In other instances, well known materials or methods have not been described in detail in order to avoid unnecessarily obscuring the present invention.

Holographic data storage devices have the potential to overcome the I/O gap described above in the background of the invention. This can be achieved by using a parallel page-based architecture and by employing high-speed electronic addressing, for example by using tunable diode lasers, to reduce access latency and improve the sustained data transfer rate by some 2–3 orders of magnitude compared to conventional serial devices. Thus, holographic data storage has the potential to provide transfer rates in the gigabit per second (Gbps) range. Generally speaking, holographic data storage has the potential to redefine the rules for computer system design. Busses and controllers would no longer be limited by peripheral devices, and new applications based on rapid access to large graphical databases would become feasible.

The present invention describes a method for ferroelectric domain screening in holographic data storage. In the recording and reading of holographic data (or holograms) the present invention is utilized to prevent the erasure of holograms during multiplexing or readout by pinning the hologram in the form of a ferroelectric domain pattern. Domain screening provides the holographic data storage system with an improved dynamic range, and allows for a more versatile sequential recording schedule. In one embodiment of the present invention, holograms are recorded using domain screening in an unpoled crystal. The use of an unpoled crystal also eliminates the deleterious effects of photorefractive beam coupling and amplified beam fanning. Thus, the present invention can be used to make holographic data storage a more viable alternative to current mass storage peripherals.

Figure 1:
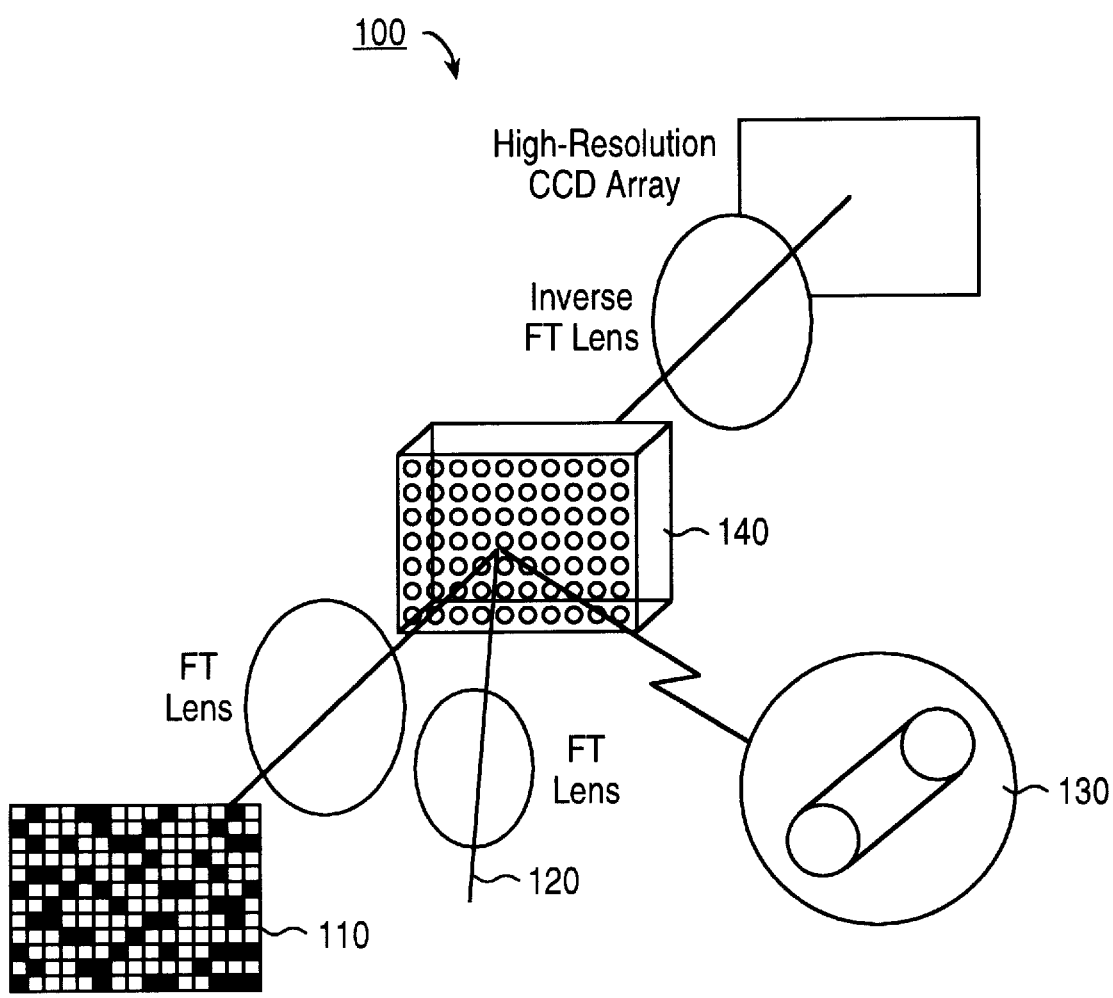
FIG. 1 illustrates a generic holographic data storage (HDS) architecture.
Figure 2A:
FIG. 2a illustrates the diffraction efficiency of a first hologram recorded using a prior art method and system.
Figure 2B:
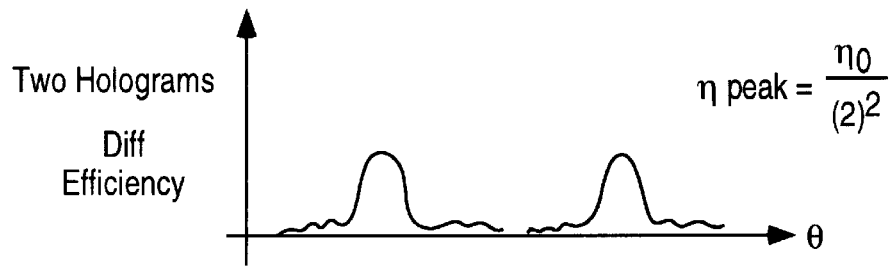
FIG. 2b illustrates the diffraction efficiencies of first and second holograms recorded using a prior art method and system.
Figure 2C:
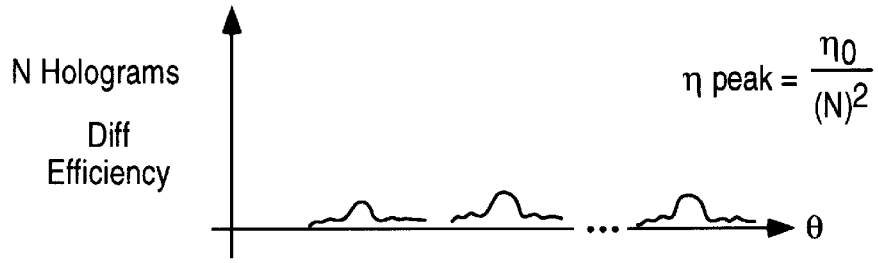
FIG. 2c illustrates the diffraction efficiencies of first, second, and Nth holograms recorded using a prior art method and system.
Figure 3:
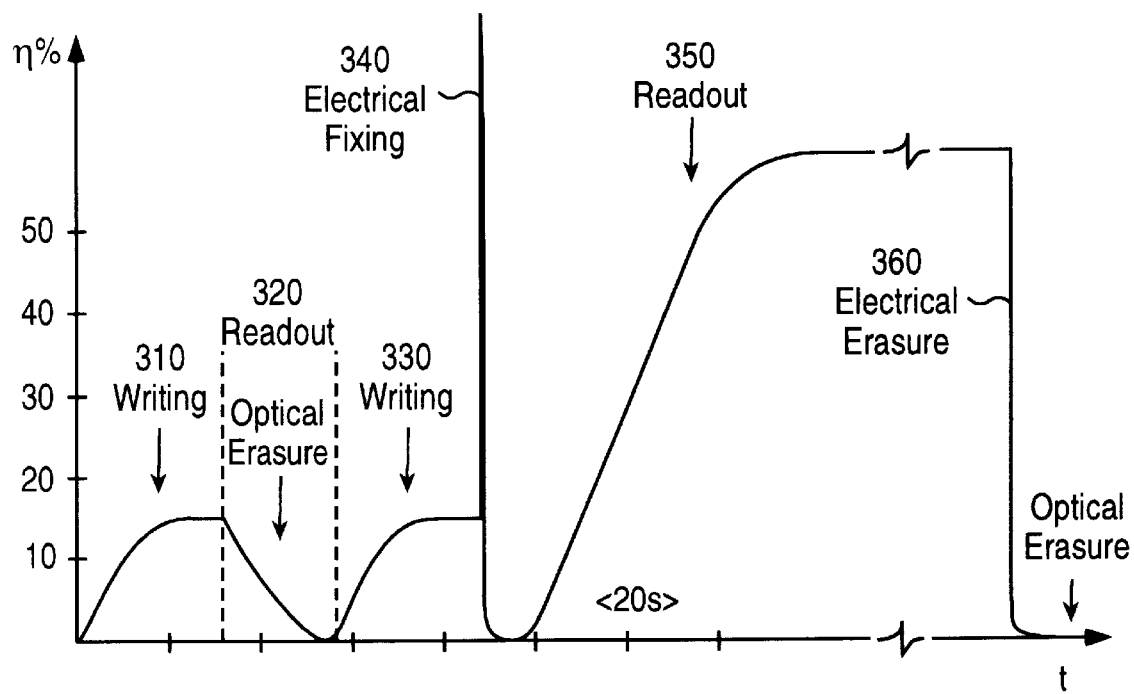
FIG. 3 illustrates the diffraction efficiencies observed with respect to the prior art electrical fixing method.
Figure 4:
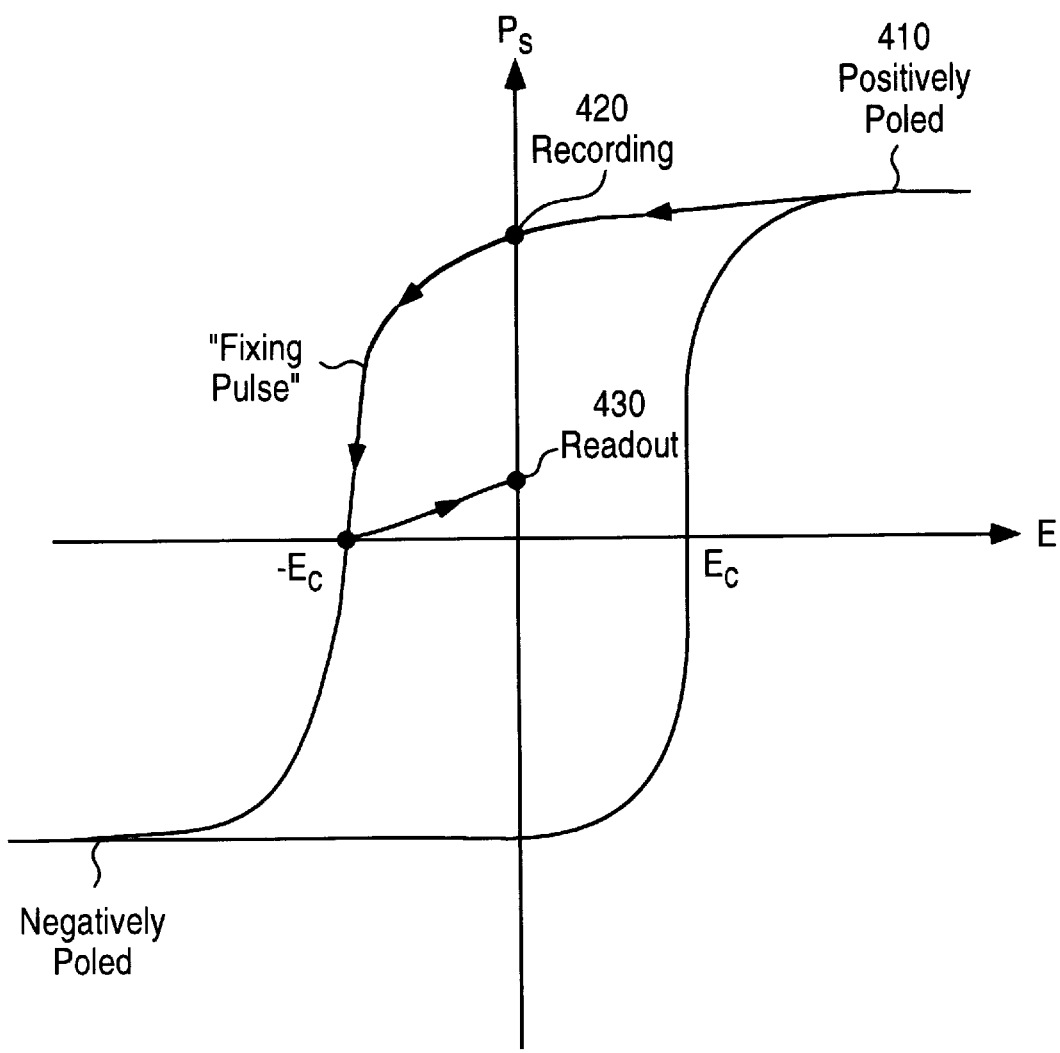
FIG. 4 illustrates a hysteresis curve for the prior art electrical fixing method.
Figure 5:
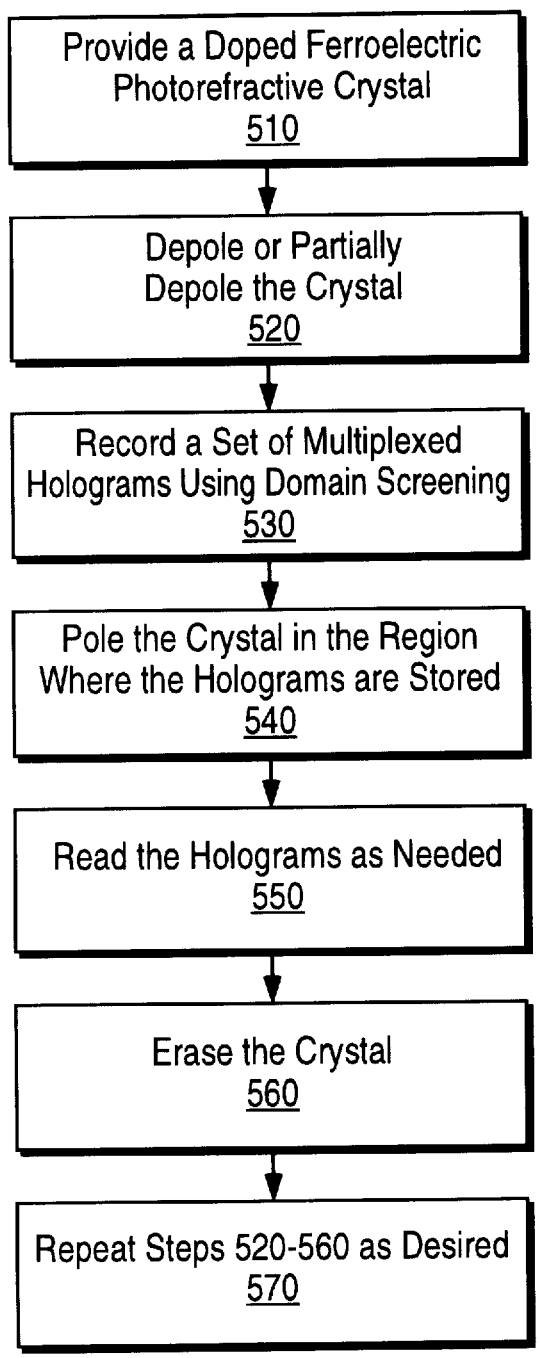
FIG. 5 illustrates a flow chart of the general steps for one embodiment of the present invention.

FIG. 5 illustrates a flow chart of the general steps for one embodiment of the present invention. At step 510 a doped ferroelectric crystal is provided. At step 520, the crystal is depoled or at least partially depoled before recording. At step 530, a set of multiplexed holograms are recorded by illuminating the crystal such that domain screening is caused within the crystal. At step 540, the crystal is poled or partially poled in the region where the holograms are stored. It should be noted and it will be obvious to one with ordinary skill in the art that poling the crystal will only be necessary where recording was performed in an unpoled or partially unpoled crystal or where the crystal was unpoled prior to reading the crystal. At step 550, the hologram (or holograms) is/are read by illuminating the crystal at approximately the same angle and/or wavelength at which the hologram was recorded. At step 560, the holograms can be erased from the crystal and at step 570, steps 520 through 560 may be repeated as desired. These general steps and additional embodiments of the present invention are described in greater detail below.

Figure 6A:
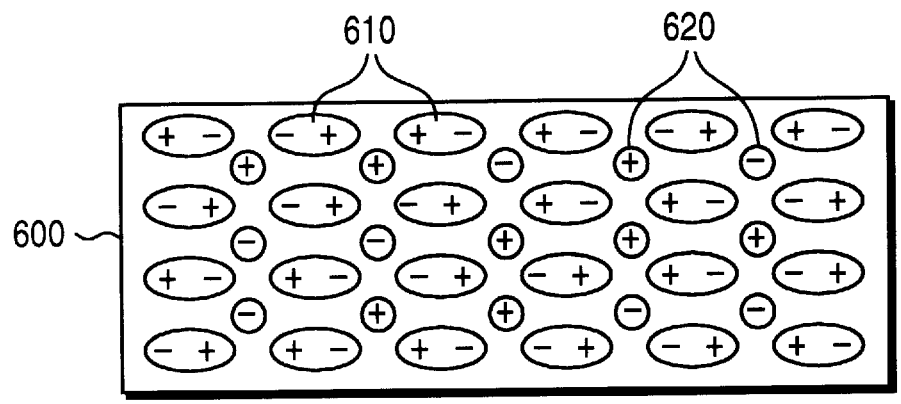
FIG. 6a illustrates a ferroelectric crystal in an initial unpoled state.

In the present invention a doped ferroelectric photorefractive material is used to store the hologram. One or more dopants are added to the crystal during growth to provide photorefractive trapping centers. Dopants typically take the form of transition metal ions or rare earth ions. It should be noted that with some ferroelectric materials the efficiency with which domain screening can enhance holographic storage depends strongly upon dopant concentration. In one currently preferred embodiment of the present invention, a heavily doped material with the effective photorefractive trap concentration in the range of approximately $10^{18}$ to $10^{20}$ $cm^{-3}$ is used. Some examples of ferroelectric materials that may be used in holographic data storage are the ferroelectric refractory oxides and tungsten bronzes, such as, $LiNbO_3$, $BaTiO_3$, SBN, PBN, BSKNN, and KTN. FIG. 6a illustrates a ferroelectric crystal 600 in an initial state. The ferroelectric domains 610 and photorefractive charge sites 620 have a random distribution in their initial state before recording. The ferroelectric crystal may be poled, partially poled or unpoled for recording. In FIG. 6a, crystal 600 is illustrated as being unpoled, which represents one embodiment of the present invention.

Figure 7A:
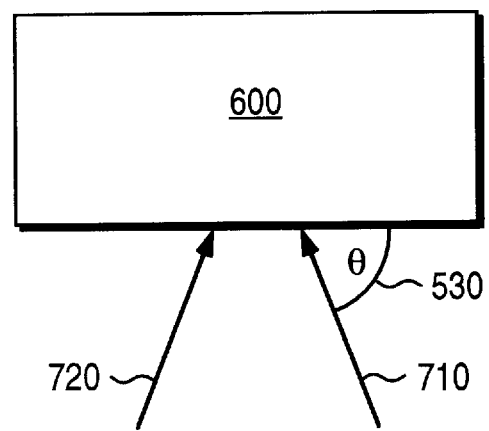
FIG. 7a illustrates recording a photorefractive hologram in a crystal.
Figure 7B:
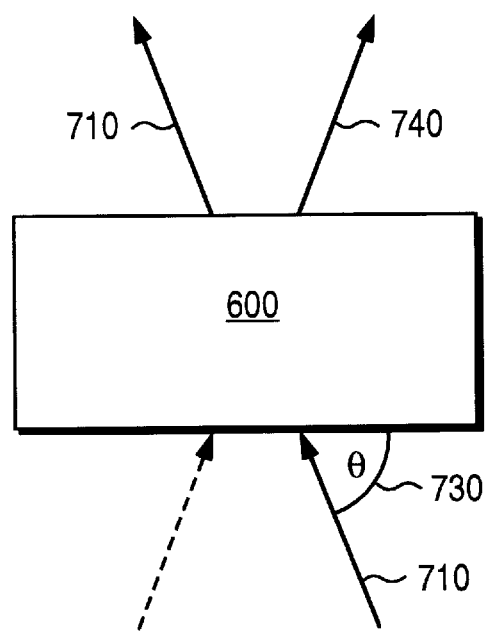

FIGS. 7a and 7b illustrate recording and reading holograms in a photorefractive crystal, respectively. In FIG. 7a, crystal 600 is illuminated to record a hologram. In one embodiment of the present invention the crystal is illuminated using two coherent beams, an object beam 720 and a reference beam 710. At least one of beams 710 and 720 contain information to be recorded in the photorefractive crystal as a photorefractive hologram. In one embodiment of the present invention the data to be stored is contained in object beam 720. It should be noted and it will be obvious to one with ordinary skill in the art that any and or all of the beams used to illuminate the crystal may contain information. It should also be noted and it will be obvious to one with ordinary skill in the art that, more than two beams may be used to record a hologram, any and/or all of which may contain information.

The photorefractive crystals are characterized by a real-time response in which the spatially varying optical interference pattern inside the crystal can be converted into a corresponding change in the refractive index of the crystal. The spatially varying optical interference pattern is formed by the intersection of two or more coherent optical waves, such as the intersection of object beam 720 and reference beam 710. The conversion process involves the photoexcitation and redistribution of photorefractive charge from localized trapping centers. The photorefractive charge is excited out of these localized trapping centers and is then redistributed by drift and diffusion, eventually being retrapped at empty trapping centers. This charge redistribution leads to a photorefractive space-charge electric field that modulates the refractive index, via the electro-optical effect, so as to mimic the incident interference pattern.

Figure 6B:
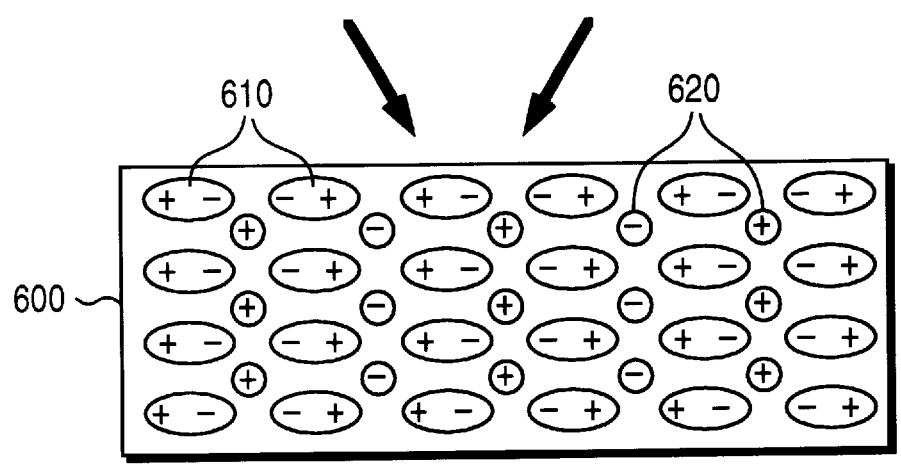

The photorefractive space-charge electric field, created by this charge redistribution, if sufficient enough, can cause local ferroelectric domain reversal. FIG. 6b illustrates local domain reversal of ferroelectric domains 610 caused by the redistribution of photorefractive charge sites 620. Ferroelectric domains 610 are reversed so that the crystal is now more-or-less periodically poled. The domain reversal has essentially created two holograms: a driving hologram (or nominal photorefractive hologram) and a domain hologram that forms in response. Each of these two holograms act to "screen" one another. The holograms screen one another in the sense that the domain hologram forms to minimize the net electric field (free energy minimization) created by the photorefractive charge redistribution. This process is referred to as domain screening. In other words, the domains reverse in such a way that their positive poles are pulled toward the negative charges and their negative poles are pulled toward the positive charges, thereby on average canceling out any net electric field. It should be noted and it will be obvious to one with ordinary skill in the art that the screening process need not be complete so there can exist some net field, however, the net field is substantially reduced in comparison to either the photorefractive or domain components individually.

Domain screening creates a larger dynamic range for recording in the crystal. In order to understand the concept of domain screening and how it increases the dynamic range of the crystal it is important to understand the distinction between steady-state and saturation of the crystal. Steady-state has to do with the photorefractive charge redistribution dynamics, and saturation has to do with the concentration of photorefractive trapping centers. Given a sufficient exposure, a crystal may reach a steady state in which any further exposure of a given intensity pattern will not yield any further change in the corresponding photorefractive response. In other words, in steady state no more photorefractive charge redistribution occurs whether or not the photorefractive trapping centers (traps) are saturated. At saturation, the crystal response is limited because all of the photorefractive traps are either locally filled or empty. In other words, at saturation the crystal simply cannot locally support any more modulation of the photorefractive charge density. A crystal can enter steady state without going into saturation. Domain screening acts to drive the crystal more toward saturation than would otherwise be the case.

Pushing the crystal toward saturation is the essence of the improved dynamic range provided by domain screening. In recording, as the photorefractive space charge field builds, it acts as a repulsive force against further space charge accumulation. Steady state is reached when the optical driving force for space charge redistribution is balanced by the repulsive forces. Because domain screening minimizes the net electric field inside the crystal during recording, the repulsion force is reduced, thereby allowing more photorefractive space charge to accumulate until either diffusion limits the process or saturation occurs.

It should be noted that in the present invention heavily doped crystals are used, so that there exists sufficient trap concentration, such that domain screening can be effectively employed to increase the dynamic range of the crystal. If trap concentration is too low, then a crystal can be driven to saturation without utilizing domain screening. However, in crystals with a high trap concentration the dynamic range can be made larger by driving the crystal closer to saturation. A large space-charge concentration essentially leads to a larger dynamic range and consequently a higher storage capacity. Without domain screening the space-charge pattern would reach a lower steady-state amplitude. Consequently, the space-charge concentration in a crystal without domain screening might not reach saturation no matter how long the crystal is exposed. Therefore, without domain screening the holograms may be weak and more susceptible to erasure during subsequent recording steps.

After recording, the crystal is then poled (or repoled) for reading. The crystal is poled by applying an electric field to realign the ferroelectric domains 610, without affecting the large space-charge concentrations. The higher space-charge concentrations make a much larger photorefractive hologram with a greater diffraction efficiency (i.e. a stronger hologram with improved signal-to-noise ratio during reading).

FIG. 7b illustrates crystal 600, after it has been repoled, and during reading. During readout at least one beam is used to reconstruct the other beam (or beams) via diffraction. In one embodiment of the present invention, and as illustrated in FIG. 7b, reference beam 710 is used. Reference beam 710 is incident upon the crystal at the same angle, $\theta$, and/or wavelength, $\lambda$, during readout as it was during recording. During readout part of reference beam 710 goes through crystal 600 and another part of reference beam 710 is diffracted to reconstruct object beam 720 as diffraction signal 740. Diffraction signal 740 is essentially a replica of object beam 720. Diffraction signal 740 contains the data stored in the particular hologram being read.

Figure 8A:
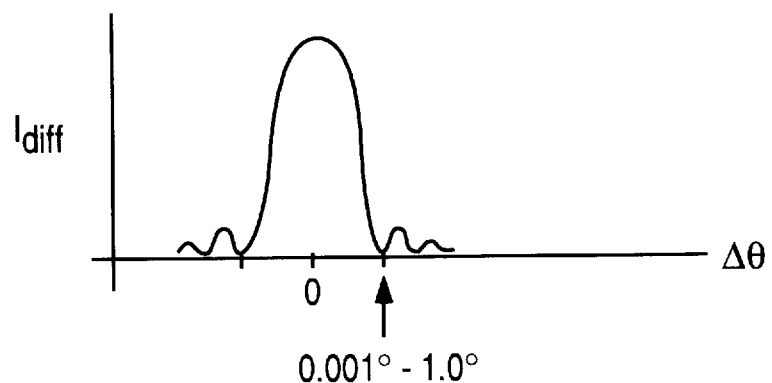
FIG. 8a illustrates the angular selectivity curve for the intensity of the diffraction ($I_{diff}$) signal versus the change in angle of the reference beam ($\Delta\theta$).
Figure 8B:
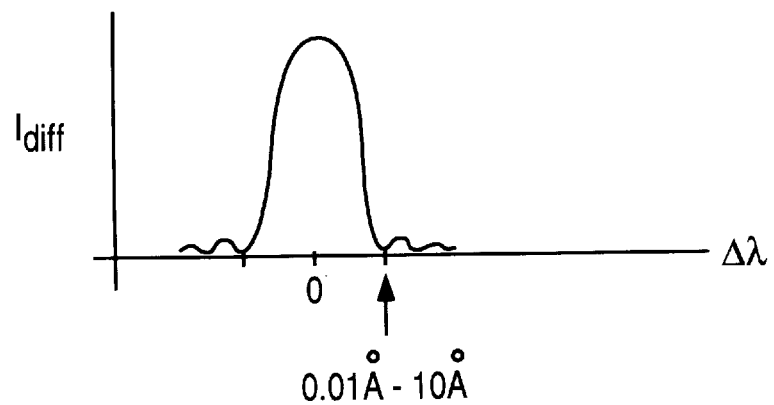
FIG. 8b illustrates the angular selectivity curve for the intensity of the diffraction ($I_{diff}$) signal versus the change in wavelength of the reference beam ($\Delta\lambda$).

Because the photorefractive hologram has been recorded using domain screening, upon poling the diffraction efficiency ($\eta = I_{diff}/I_{ref}$) is increased. However, if crystal 600 is rotated or the angle and/or wavelength of reference beam 710 is changed, the diffraction efficiency of diffraction signal 740 very quickly falls off, as is illustrated in FIGS. 8a and 8b. FIG. 8a illustrates the angular selectivity curve for the intensity of the diffraction ($I_{diff}$) signal versus the change in angle of the reference beam ($\Delta\theta$). As is illustrated in FIG. 8a, if the photorefractive hologram is read out at the same angle that was used for recording (i.e. the angle of the reference beam is not changed) then maximum diffraction intensity is achieved. However, if the angle of the reference beam is changed slightly with respect to the crystal the diffraction intensity falls off rapidly. As illustrated in FIG. 8a, the full-width half-maximum of the angular selectivity curve could be a few thousandths of a degree to one degree (i.e. $\Delta\theta = 0.001° - 1.0°$) depending upon the hologram fringe spacing. In mass holographic data storage based on angular multiplexing, it is desirable to minimize the width of the angular selectivity curve, such that many holograms may be recorded within the same volume with high packing densities.

FIG. 8b illustrates the wavelength selectivity curve for the intensity of the diffraction signal ($I_{diff}$) versus the change in the wavelength of the reference beam ($\Delta\lambda$). As is illustrated in FIG. 8b, if the photorefractive hologram is read out at the same wavelength that was used for recording (i.e. the wavelength of the reference beam is not changed) then maximum diffraction intensity is achieved. However, if the wavelength of the reference beam is changed slightly the diffraction intensity falls off rapidly. As illustrated in FIG. 8b, the full-width half-maximum of the wavelength selectivity curve could be one hundredth of an angstrom to ten angstroms (i.e. $\Delta\lambda$=0.01 Å–10 Å) depending upon the hologram fringe spacing. Similar to mass holographic data storage based on angular multiplexing, in mass holographic data storage based upon wavelength multiplexing it is desirable minimize the width of the wavelength selectivity curve, such that many holograms may be recorded within the same volume with high packing densities.

Figure 9A:
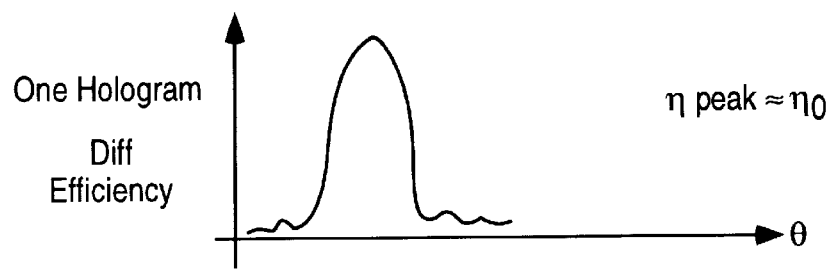
FIG. 9a illustrates the diffraction efficiency of a first hologram recorded using a the present invention.
Figure 9B:
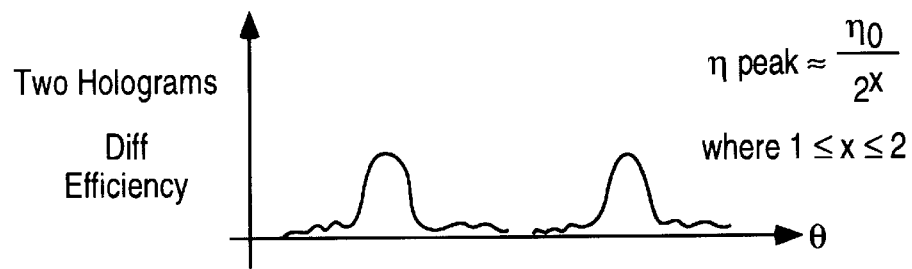
FIG. 9b illustrates the diffraction efficiencies of first and second holograms recorded using the present invention.
Figure 9C:
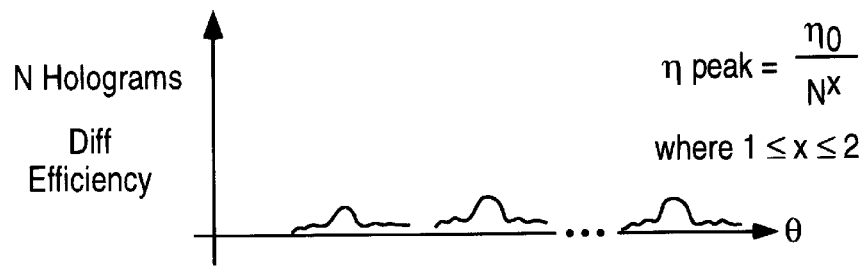
FIG. 9c illustrates the diffraction efficiencies of first, second, and Nth holograms recorded using the present invention.

Because photorefractive gratings recorded with domain screening resist erasure, the process of domain screening described herein may be used in sequential multiplexing to overcome the problem of erasure of existing holograms by subsequent exposures. It should be noted that some erasure will still occur, as is illustrated in FIGS. 9a–c, however, the diffraction efficiency of earlier recorded holograms does not fall off as rapidly as with prior art methods and systems. Recall that with prior art methods and systems there exists a $1/N^2$ dependence in the diffraction efficiency of multiplexed holograms, such that the diffraction efficiency falls off so rapidly that a regimented recording schedule must be followed or else by the time the Nth hologram is recorded all of the holograms are nonexistent or nonreadable.

As illustrated in FIGS. 9a–c the diffraction efficiency of multiplexed holograms using the present invention has a dependence of approximately $1/N^x$, wherein $1 \leq x \leq 2$. Thus, the methods and systems for sequential multiplex recording of N holograms using domain screening yield a peak diffraction efficiency ($\eta_{peak}$) of approximately $\eta_{peak} = \eta_0/N^x$, wherein $1 \leq x \leq 2$.

When recording and reading holograms with data patterns it is desirable to have a high diffraction efficiency because the diffraction efficiency dictates the signal-to-noise ratio, capacity, data transfer rates, and other important properties of the system. So, for example, in a working holographic memory that has at least N=100 pages per stack, the diffraction efficiency of a system using domain screening with a dependence of approximately $\eta_0/N$ (i.e. where x=1) records holograms with a $\eta_0/100$ effective dynamic range instead of a prior art system with a dependence of approximately $\eta_0/N^2$ that records holograms with a $\eta_0/10,000$ dynamic range. Therefore, in general, obtaining the 1/N limit means at least an N-fold improvement in capacity assuming a fixed background scattering noise level.

The fact that holograms recorded using domain screening resist optical erasure during multiplexing also means that the sequential recording exposures need not follow as regimented a schedule as prior art methods and systems require. The use of domain screening allows the use of a more versatile sequential recording schedule to achieve a set of holograms with virtually equal diffraction efficiencies. Ideally, if no erasure takes place during subsequent recording, then equal exposures can be used to record each hologram.

Figure 10:
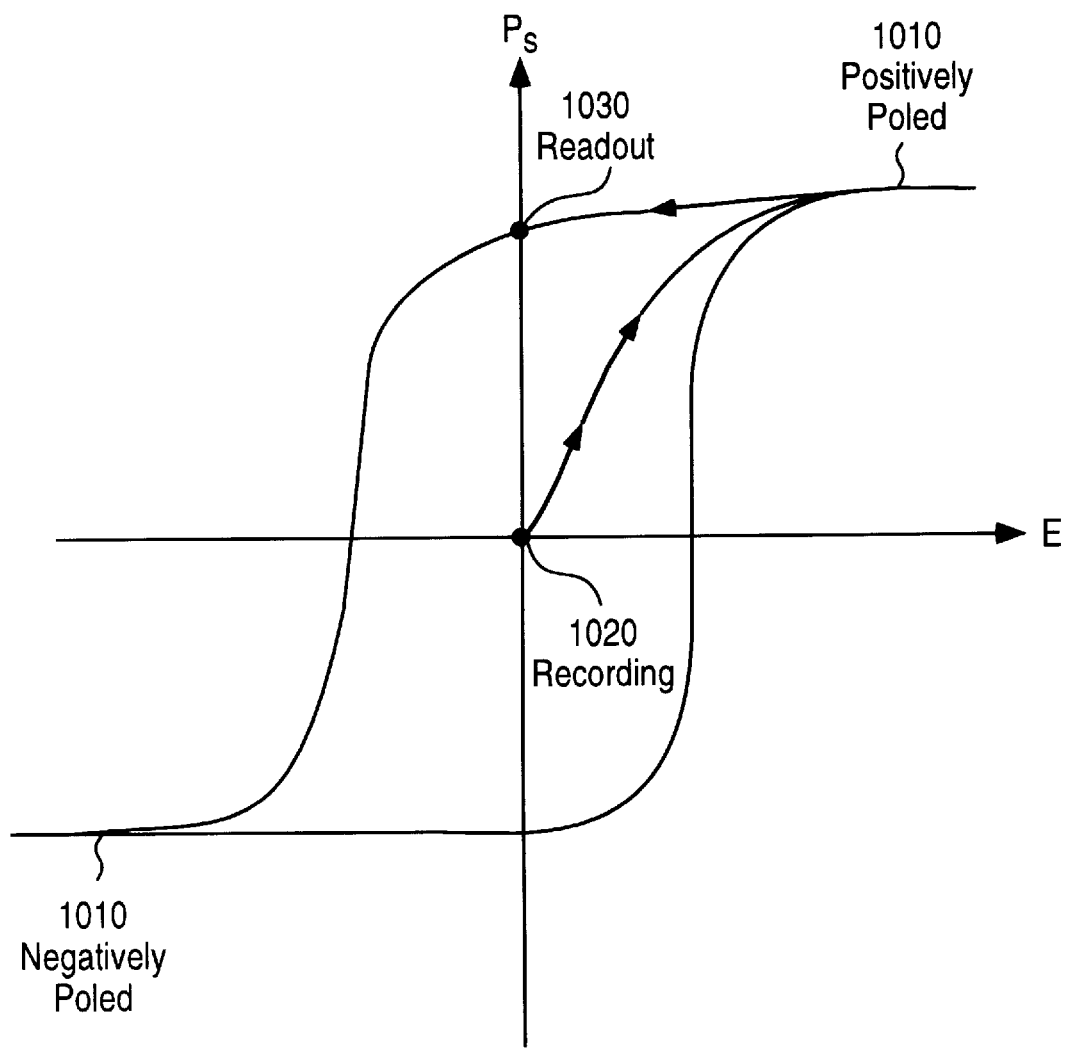
FIG. 10 illustrates a hysteresis curve for one embodiment of the present invention.

FIG. 10 illustrates a hysteresis curve (or loop) for one embodiment of the present invention, wherein $P_s$ is the spontaneous polarization of the crystal and E is the electric field. If the crystal is poled 1010 at the outset (either positively or negatively), before recording the crystal is first depoled. The crystal can be depoled either by applying an electric field to the crystal or raising the crystal above its Curie temperature. The crystal is then allowed to settle to point 1020 where recording is performed. After recording the crystal is then repoled 1010 by applying a sufficiently large positive or negative electric field to the crystal. The electric field is then removed and the crystal settles to point 1030 where readout is performed. It will be appreciated by one skilled in the art that upon settling to point 1030, some degree of domain hologram reformation can occur leading to prolonged nondestructive readout.

The domain screening process described above has additional advantages when recording in an unpoled (or depoled) crystal. In addition to obtaining optimum domain screening, recording in an unpoled crystal eliminates photorefractive beam fanning and beam coupling effects that might otherwise degrade the signal-to-noise level to an unacceptable level.

Figure 11:
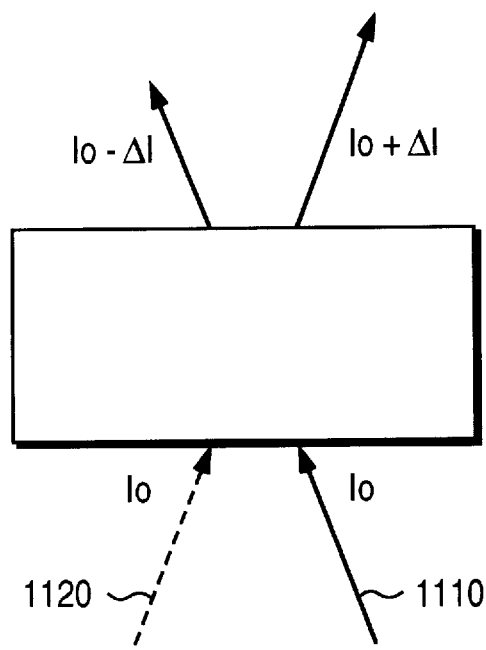
FIG. 11 illustrates beam coupling in a poled crystal.

Beam coupling is illustrated in FIG. 11. Beam coupling is an optical phenomenon wherein the diffraction pattern of the crystal causes the intensities of the recording beams to mix such that the intensity of one beam, 1120, is amplified at the expense of the other beam, 1110, or vice versa. Thus, the diffraction efficiency and Bragg condition of the recorded photoelectric hologram may be altered in an unpredictable fashion. If recording is performed in an unpoled crystal, beam coupling cannot occur due to the random orientation of the ferroelectric domains and the corresponding absence of a linear electroptic effect.

Figure 12:
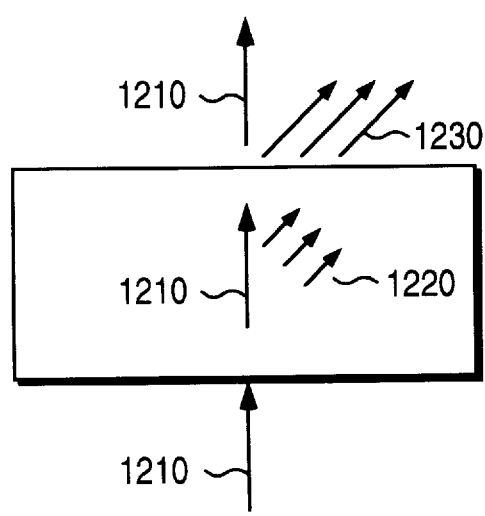
FIG. 12 illustrates photorefractive beam fanning (i.e. amplified fanning) in a poled crystal.

Photorefractive beam fanning (i.e. amplified fanning) is illustrated in FIG. 12. Amplified fanning occurs when small portions of beam 1210 are scattered, e.g. portions 1220, as beam 1210 passes through the crystal. As the scattered portions 1220 propagate through the crystal they are amplified creating amplified portions 1230. Like beam coupling, if recording is performed in an unpoled crystal amplified fanning cannot occur.

A crystal can be depoled either thermally or electrically. To thermally depole a crystal, the crystal should be heated above its Curie temperature until depoling occurs and then may be allowed to cool for recording. To electrically depole a crystal, metal electrodes, for example silver, or liquid electrolyte electrodes, for example aqueous LiCl, may be used to apply a negative electric field across the crystal. It should be noted that the magnitude of the depoling field is approximately equal to the coercive field. Liquid electrolyte electrodes are advantageous over metal electrodes which may damage the crystal during depoling.

Following recording, an external poling field can then be applied to the recording volume to realign the ferroelectric domains, thereby revealing the strong photorefractive holograms having much improved diffraction efficiencies. Furthermore, this procedure can be combined with a technique for nondestructive readout, such as two-photon recording, to yield a material with near optimal performance.

It should be noted that, recording in an unpoled crystal could be degraded by spurious optical scattering from domains. However, it should also be noted that, if the characteristic domain size is much smaller or much larger than the optical wavelength then minimal scatter will arise. Thus by maintaining domain sizes much smaller or much larger than the optical wavelength, there is negligible difference in the scattering strength between poled and unpoled crystals.

Thus, a Novel Utilization of Ferroelectric Domain Screening for High Capacity Holographic Memory has been described. Although specific embodiments, including specific equipment, parameters, methods, and materials have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described. For example, the teachings in this invention may be applied to fabricate improved holographic wavelength filters that are based on multiplexed photorefractive gratings.

What is claimed is:

1. A method for holographic data storage comprising:
   first providing a doped ferroelectric crystal material;
   then depoling at least a portion of said crystal; and
   then recording a photorefractive hologram in said depoled portion of said crystal, wherein said step of recording said photorefractive hologram continues until domain screening occurs.

2. The method as described in claim 1 further comprising the steps of:
   poling at least a portion of said crystal; and
   reading said photorefractive hologram.

3. The method as described in claim 1 wherein said crystal has a high dopant concentration such that the effective photorefractive trap concentration is in the range of approximately $10^{18}$ to $10^{20}$ cm$^{-3}$.

4. The method as described in claim 1 wherein said crystal material comprises a ferroelectric refractory oxide.

5. The method as described in claim 1 wherein said crystal material comprises a tungsten bronze.

6. The method as described in claim 1 wherein said crystal is selected from the group consisting of: $LiNbO_3$, $BaTiO_3$, PBN, SBN, BSKNN, and KTN.

7. The method as described in claim 1 wherein said step of depoling said crystal is performed by selecting from the group consisting of: raising the temperature of said crystal above the Curie temperature of said crystal and applying an electric field to said crystal.

8. The method as described in claim 7 wherein said electric field is applied using one of: metal electrodes and liquid electrolyte electrodes.

9. The method as described in claim 8 wherein said liquid electrolyte electrodes comprise aqueous LiCl.

10. The method as described in claim 1, wherein said method is repeated to record multiple sets of photorefractive holograms.

11. The method as described in claim 10 wherein said method provides a diffraction efficiency of approximately $\eta_0/N^x$, wherein $1 \leq x < 2$, when sequentially multiplexing N holograms, and wherein $\eta_0$ is the maximum diffraction efficiency for said crystal.

12. The method as described in claim 10 wherein said method provides a prolonged nondestructive readout.

13. The method as described in claim 1 wherein said step of recording said photorefractive hologram is performed by illuminating said crystal by crossing an object beam and a reference beam in order to create an interference pattern in said crystal.

14. The method as described in claim 13 wherein at least one of said object and reference beams contains data to be recorded.

15. The method as described in claim 2 wherein said step of poling said crystal is performed by applying an electric field to said crystal.

16. The method as described in claim 2 wherein said step of reading said photorefractive hologram is performed by illuminating said crystal with a reference beam and wherein said reference beam is incident upon said crystal at the same angle as during said step of recording said photorefractive hologram.

17. The method as described in claim 2 wherein said step of reading said photorefractive hologram is performed by illuminating said crystal with a reference beam and wherein said reference beam is incident upon said crystal at the same wavelength as during said step of recording said photorefractive hologram.

18. A method for holographic data storage comprising:
   first providing a doped ferroelectric crystal material;
   then depoling at least a portion of said crystal;
   then recording a photorefractive hologram in a part of said depoled portion of said crystal, wherein said step of recording said photorefractive hologram continues until domain screening occurs;
   then poling at least said recorded part of said depoled portion of said crystal; and
   then reading said photorefractive hologram.

19. The method as described in claim 18 wherein said step of recording a photorefractive hologram is performed by illuminating said crystal by crossing an object beam and a reference beam in order to create an interference pattern in said crystal and wherein at least one of said object and reference beams contains data to be recorded.

20. The method as described in claim 18 wherein said step of poling said crystal is performed by applying an electric field to said crystal.

21. The method as described in claim 18 wherein said step of reading said photorefractive hologram is performed by illuminating said crystal with a reference beam and wherein said reference beam is incident upon said crystal at the same angle as during said step of recording said photorefractive hologram.

22. The method as described in claim 18 wherein said step of reading said photorefractive hologram is performed by illuminating said crystal with a reference beam and wherein said reference beam is incident upon said crystal at the same wavelength as during said step of recording said photorefractive hologram.

23. The method as described in claim 18 wherein said crystal has a high dopant concentration such that the effective photorefractive trap concentration is in the range of approximately $10^{18}$ to $10^{20}$ cm$^{-3}$.

24. The method as described in claim 18 wherein said crystal material comprises a ferroelectric refractory oxide.

25. The method as described in claim 18 wherein said crystal material comprises a tungsten bronze.

26. The method as described in claim 18 wherein said crystal is selected from the group consisting of: $LiNbO_3$, $BaTiO_3$, PBN, SBN, BSKNN, and KTN.

27. The method as described in claim 18 wherein said step of depoling said crystal is performed by selecting from the group consisting of: raising the temperature of said crystal above the Curie temperature of said crystal and applying an electric field to said crystal.

28. The method as described in claim 27 wherein said electric field is applied using one of: metal electrodes and liquid electrolyte electrodes.

29. The method as described in claim 28 wherein said liquid electrolyte electrodes comprise aqueous LiCl.

30. The method as described in claim 18, wherein said method is repeated to record and read multiple sets of photorefractive holograms.

31. The method as described in claim 18 wherein said method provides a diffraction efficiency of approximately $\eta_0/N^x$, wherein $1 \leq x < 2$, when sequentially multiplexing N holograms, and wherein $\eta_0$ is the maximum diffraction efficiency for said crystal.

32. The method as described in claim 18 wherein said method provides a prolonged nondestructive readout.

33. A method for holographic data storage comprising:
first providing a doped, unpoled ferroelectric crystal material;
then recording a photorefractive hologram in a part of said unpoled crystal, wherein said step of recording said photorefractive hologram continues until domain screening occurs; and
then poling at least said recorded part of said unpoled portion of said crystal.

* * * * *

UNITED STATES PATENT AND TRADEMARK OFFICE
CERTIFICATE OF CORRECTION

PATENT NO. : 5,822,090
DATED : October 13, 1998
INVENTOR(S) : Jeffrey P. Wilde

It is certified that error appears in the above-indentified patent and that said Letters Patent is hereby corrected as shown below:

In the Title Page at [73] delete "Quinta Corporation, San Jose, Calif." and insert --Seagate Technology, Inc. Scotts Valley, Calif.

Signed and Sealed this

Fifth Day of October, 1999

Attest:

Q. TODD DICKINSON

Attesting Officer

Acting Commissioner of Patents and Trademarks